United States Patent Office 3,041,182
Patented June 26, 1962

3,041,182
COLLAGEN ENCLOSED SAUSAGE-TYPE PRODUCT AND METHOD OF PREPARING SAME
Leo J. Hansen, Everett V. Podebradsky, and Joseph L. Shaw, Madison, Wis., assignors to Oscar Mayer & Co., Inc., Chicago, Ill., a corporation of Illinois
No Drawing. Filed Apr. 28, 1958, Ser. No. 731,105
5 Claims. (Cl. 99—169)

The present invention is directed particularly to the application of collagen to an edible product, such as a ground meat product of the sausage variety, and the product formed thereby provided with the collagen shell-like casing or coating which is of such a nature as to provide the product with adequate self-sustaining properties for heat processing and consumption. With respect to consumption of the coated product, the collagen coating is readily masticated thus totally eliminating the step of skinning sausage variety products following heat processing or cooking thereof or, in the instance of a conventional sausage product, eliminating the casing in which the sausage is stuffed for self-sustaining cooking by the consumer.

As is conventionally practiced, comminuted food products such as sausage are stuffed in natural or synthetic casings, formed into links and either marketed in this manner or precooked or smoked with the casings often being subsequently stripped from the links following adequate coagulation of the protein of the product to impart thereto self-sustaining properties. Continued and rather extensive efforts have been made over the years to eliminate the necessity of forming a linked product with the use of natural or synthetic casings. It is very difficult to control the weight of each link product on the basis of stuffing a tube-like casing and subsequently tying off sections of the stuffed casing to form the individual products. Often each link is purposely overweight to avoid variation in the number of links enclosed in a single package. Natural and synthetic casings are expensive and where stripping operations are used, the casings serve merely to hold the product during cooking and do not form a part of the product for merchandising. Natural casings are expensive to process and handle and they also present problems from the standpoint of cleanliness.

Appreciable experimental work has been carried out in connection with the development of a synthetic, readily edible casing in an effort to overcome the aforementioned disadvantages residing in the use of natural and known synthetic casings. Some of this work has been directed to the use of collagen obtained from sinews, hides, etc. with the collagen being treated for extrusion into synthetic casings. However, it has been found that collagen casings must be specially treated, such as being subjected to known tanning treatments, to impart thereto the requisite strength for retention of the link shape of the product during handling and heat processing. Resorting to tanning treatments often results in a toughening of the collagen casings to a degree that the same are not readily masticated and thus do not constitute a substantial improvement over specially treated natural casings. Furthermore, the problem of size and weight control of the individual links still exists.

Collagen has been utilized in forming sutures and considerable difficulty has been encountered in attempting to form collagen sutures exhibiting requisite tensile strength. In an effort to overcome this difficulty, it has been suggested that retention of collagen fiber length is important although, following the suture spinning operation, tanning treatment of the collagen sutures has been further suggested to impart thereto the requisite strength.

It is an object of the present invention to provide a new and improved method of applying collagen to the outer surfaces of an edible food product whereby the collagen in shell or coating form functions to sustain the product in its predetermined shape during heat processing thereof.

Another object is to utilize collagen in a manner to efficiently coat or cover a sausage-type product for cooking and handling thereof while providing for uniformity in shape and size of the product to particularly adapt the coated product for continuous manufacture within controlled specifications.

A further object is to provide a new and improved method of forming an edible food product of the sausage variety of any desired shape with the product having applied thereto a covering shell or coating of collagen imparting to the product self-sustaining properties for heat processing thereof while further being fully edible and readily masticated thus eliminating the necessity of stripping the shell type coating from the product following heat processing thereof.

Still a further object is to provide a new and improved method of application of collagen to an edible product of the sausage variety for the purposes set forth in the foregoing objects.

A further important object of the present invention is the provision of a new and improved edible food product preferably of the sausage variety having applied to the outer surface thereof a shape sustaining collagen shell or coating.

An additional and equally important object is to provide a new and improved type of food product casing which is in the form of an uninterrupted seamless shell formed from untanned natural collagen.

Other objects not specifically set forth will become apparent from the following detailed description of the present invention.

Basically, the present invention deals with the method of preparation of a collagen encased, completely edible product including the steps of forming and shaping the product, applying to the exposed surfaces of the product a coating of a dilute collagen dispersion, and drying the coating on the product. In following this method, a fully edible product can be obtained wherein the collagen coating functions to impart shape retention to the product with particular application of the invention residing in the preparation of comminuted meat products of the sausage variety. The comminuted meat products of the present invention have applied thereto a collagen coating which sustains the batter or mixture in predetermined shape for handling during heat processing or cooking as well as merchandising prior to cooking.

In preparing the collagen for application to a product, a rather specific procedure is preferably followed in order to impart to the applied coating adequate binding strength to contain a comminuted or pressed piece type product and prevent disintegration thereof. There are several different sources of collagen in animals such as tendons, diaphragms, skins, etc. The preferred source of collagen for purposes of the present invention is the leg tendon of beef, veal or pork. These tendons or other sources of collagen are trimmed of foreign matter, lean meat and excessive fatty tissue. The tendons are placed in a suitable holding form or other equipment capable of retention of the same for slicing and the tendons are hard frozen and then sliced lengthwise longitudinally therealong to retain original fiber length as much as possible. In this respect the tendons should not be sliced transversely thereof as this results in fiber length reduction which can materially effect the properties of the coating to be formed from the collagen.

In slicing the tendons as previously described, the tendons placed in each form are preferably frozen solid prior to slicing to facilitate this operation as well as assure reasonable accuracy in fiber length retention. By way of example, the collagen slices may be 1/32 of an inch or thinner. The purpose is to subdivide the tendons to a reasonable extent for fiber separation purposes while retaining the effective unbroken length of the fiber bundles.

The tendon slices are next swelled by suitable variation of pH either by acid solution treatment or by alkali solution treatment. In following this procedure, the tendon slices are placed in a sodium hydroxide solution having a pH of approximately 12.5. While the quantity of solution will depend on the desired fluidity of the final dispersion, it has been found for the purposes of the present invention that the collagen solids concentration should preferably range from about 1/2% to 1 1/4% on a dry weight basis. A 1% collagen dispersion has been found to be perfectly adequate.

The tendon slices are allowed to swell for a period of time sufficient to obtain maximum swelling thereof. Swelling of the slices can be enhanced by maintaining the dispersion at a temperature within the range of about 18° to 22° C. with a particularly effective temperature condition being approximately 20° C. The time required to obtain maximum swelling will vary with the thickness of the tendon slices and may range from about 2 to 24 hours.

Following maximum swelling it is important to homogenize the swollen fiber mixture. This important step of the collagen preparation procedure must be practiced with care to avoid fiber length reduction to any appreciable extent. The mixture may be readily homogenized by passing the same one or more times through a colloid mill of known type wherein the mixture is subjected to homogenization for only a fraction of a second during each pass. In this manner a detrimental temperature increase or undesirable fiber length reduction is substantially avoided while obtaining complete homogenization of the mixture. By way of example, the mixture may be passed through a conventional colloid mill about 4 times with the swollen tendon slices being subjected to colloidal dispersion for a fraction of a second during each pass. The colloid mill functions to separate and disperse the fiber strands of each fiber bundle without any substantial length reduction so as to form an homogenized, rather viscous dispersion of collagen fibers for coating purposes. The dispersion formed in this manner will be adequately stable for the purposes of the present invention.

The collagen dispersion formed as described above may be used to coat any product of any shape. The fully edible and readily masticated qualities of such a coating particularly adapts the same for use in sausage making wherein natural casings have been utilized to enclose and retain the ground meat sausage formulation in link shape during either precooking or merchandising in uncooked condition followed by subsequent consumer cooking. The natural casings normally used in sausage making are at times quite tough and although being completely edible, they are sometimes difficult to masticate. The collagen coating of the present invention may also be used with smoked meat preparations as a substitute for natural casings such as in the manufacture of wieners. With this type of product, a coating of the collagen dispersion will replace the use of natural casings and will function to retain the predetermined shape of the batter or ground meat mixture sufficiently for smoking or cooking purposes. During the cooking or smoking operation, the protein of the meat incorporated in the batter or mixture coagulates and the product itself becomes self-sustaining with the collagen coating cooperatively functioning in this respect. The product may be merchandised with the collagen coating remaining intact and without the necessity of consumer removal thereof.

The manner in which the collagen dispersion is applied to form a coating or shell on an edible food product is of particular importance in the present invention. For purposes of description, this method will be illustrated in connection with the manufacture of pork sausage links. However, as will be described in greater detail, the method may be generally followed in connection with many different types of edible food products regardless of the particular shape of the product as the coating may be readily applied and will conform to any predetermined shape.

The basic ingredients of a pork sausage mixture includes pork trimmings, salt and spice. The trimmings prior to chopping are preferably chilled as, for example, to a temperature of about 30° F. The trimmings are chopped in a conventional chopper to the desired particle size. Salt and spice are added prior to or during the chopping operation to obtain distribution thereof throughout the mixture. The chopped sausage mixture should be maintained at a temperature of from 24° to 30° F. upon feeding the same into a conventional stuffer. The mixture is extruded through a stuffing horn (without being received in a casing) and divided into links of substantially equal weight by following any suitable handling procedure either of a manual or mechanical nature.

The sausage links are shell frozen in any suitable manner so as to set up the outer surfaces thereof to condition the same for shaping. Shell freezing can be accomplished at temperatures of from about minus 15° to minus 40° F. normally within a period of time of about 30 minutes. This type of freezing may be carried out in a batchwise manner or by utilizing continuous equipment such as a refrigeration tunnel incorporating therein a continuously moving conveyor arrangement. The partially frozen links are then preferably shaped by use of any suitable apparatus. Such apparatus may consist of a cylinder and piston arrangement with means for applying pressure to the piston and compressing each link into the desired final shape. Following final shaping the formed links are hard frozen for collagen coating application.

The collagen may be applied to the frozen links by following one of several different procedures. The links may be dipped in the collagen dispersion, the collagen dispersion may be sprayed or brushed onto the links or the links may be continuously moved through a bath-type arrangement of collagen dispersion in conformance with continuously operating assembly line procedures. The collagen evenly coats the frozen links and following application of the coating the low temperature of the links freezes the collagen coating thereabout on the surfaces of the links. By way of example, it has been found that momentary immersion of only a few seconds of a frozen link in the collagen dispersion maintained at room temperature results in the application of an adequate coating to the link. Removal of the link from the dispersion results in freezing of the coating thereon. About 30 seconds is perfectly adequate for application and freezing of a collagen coating.

The coated links are then transferred to a drying chamber preferably in a continuous manner as by utilization of a belt conveyor, etc. A stream of dry air is directed against the links to melt the ice particles formed thereon and dry the collagen coating by evaporation. The temperature of the air current should be below the melting point of the fat in the sausage and above the freezing point of water for best results. The time required to dry the coatings will depend upon air velocity, temperature, humidity, etc., and may range from several minutes to several hours. It has been found that by utilization of 20% relative humidity air at a temperature of 70° F. moving across the links at a velocity of 20 feet per second, the normal coating drying time will be from about 45 to 60 minutes.

Following drying of the coatings, the coated links are preferably chilled to a temperature of about 30° to 35° F. following which, if desired, the coatings are smoothed in any suitable manner. Smoothing of the coatings can be accomplished by gentle rolling of the links preferably between two belts, resulting in the provision of an uninterrupted, seamless, smooth collagen shell-like casing having adequate strength to sustain the sausage mixture in its predetermined shape during merchandising and subsequent heat processing. The links are then ready for packaging and merchandising in accordance with conventional practices.

The collagen coating exhibits the necessary strength to contain a readily disintegratable product such as an uncooked sausage mixture. This requisite strength is attributable primarily to the retention of adequate substantial length of the collagen fibers at least with respect to a substantial portion of the collagen solids forming a part of the dispersion. Subsequent tanning to impart adequate strength is unnecessary thus eliminating toughening of the collagen shells so as to maintain the same readily chewable and easily digested while additionally providing for complete edibility of the casing.

By applicaton of a collagen dispersion of the type described in the form of a coating by dipping or spraying, a completely seamless and uninterrupted shell-like casing is applied to the food product. Furthermore, the food product may take any desirable shape with uniformity in weight as it is unnecessary to have end portions available for tying off the casing as is practiced in connection with the use of natural or extruded synthetic casings. By way of example, the food product may be in the shape of a doughnut or other entirely endless mass which could not be practically formed or used by utilizing the conventional tube-type casings which may require tying off at the ends thereof in link forming operations. Still further, the food product itself need not be meat or need not be comminuted or chopped but may be in pieces, such as boned ham pieces, which require some sort of shape retention covering for merchandising. It is also possible to disperse the collagen to a degree throughout a mixture of food particles to internally bond the same to provide a self-sustaining product.

The products formed in following the teachings of the present invention are uniform in weight, shape and size. This constitutes an important advancement in the art of sausage and wiener making and results in a substantial savings by reducing overweight product production normally practiced as an assurance against breach of governmental regulations. This saving when added to that resulting from the elimination of natural or synthetic casing preparation and handling materially reduces the total cost of manufacture.

Illustrative of an alternate method of forming a collagen coating on a comminuted meat product includes the application of two of such coatings one being a basic collagen preparation of the type described and the other being an acid collagen preparation. As previously pointed out, a collagen mixture prior to colloidal dispersion may be formed by suitable variation of the pH either by alkali solution treatment or by acid solution treatment. Variation in the pH provides for swelling of the collagen slices in preparation for homogenization to form the coating dispersion. This illustrative alternate procedure includes the formation of a typical basic collagen preparation and the formation of a separate acid collagen preparation wherein the above described procedure is followed exactly with the exception that an acid solution is used in swelling the tendon slices. The acidity of the solution, by way of example, will establish a pH of approximately 2.

Hard frozen comminuted meat products are first coated with the basic collagen dispersion which forms on the products a frozen collagen crust. The acid collagen preparation is then sprayed over the frozen basic collagen coating and also becomes frozen to, in effect, provide the product with a double layer of collagen, one of which is basic and the other of which is acidic. The twice coated products are then dried as described above and the initial effect of drying results in the melting of ice formed on the product as a result of moisture drippage from the coatings. During this stage of the drying operation the acidic and basic coatings tend to neutralize one another leaving a uniform blended single coating of approximately neutral collagen fibers on the product which readily gives up moisture for subsequently adequate drying thereof.

The foregoing alternate procedure can be of importance in connection with the provision of a completely edible collagen shell which is of neutral pH. Where coatings of neutral pH are considered desirable or even essential, any suitable procedure may be followed to neutralize the collagen dried on the product surface. The foregoing specific procedure is one which may be practiced to not only serve the purpose of neutralizing the collagen shell but also where it is considered desirable to apply to a product surface a relatively substantial amount of collagen fibers to form a rather thick coating.

The following examples are illustrative of the present invention and should not be construed as limiting thereto:

*Example I*

Pork trimmings chilled to 30° F. were chopped in a conventional chopper to desired pork sausage particle size. Seasoning was added during chopping and distributed therethrough. The chopped mixture at a temperature of 30° F. was placed in a stuffer and extruded through a stuffing horn into link-type shapes of specified weight, e.g. 1 ounce. The links were shell frozen by being held under a temperature of minus 15° F. for 30 minutes. The partially frozen links were compressed into final shape and were hard frozen. The hard frozen links were dipped in a collagen dispersion containing 1% collagen solids by weight and were held in the dispersion for 5 seconds for application of a collagen coating thereto with the dispersion being maintained at room temperature. The coated links were placed in a stream of 20% relative humidity air maintained at a temperature of approximately 70° F. for 60 minutes during which time the collagen coatings were dried. The coated links were smoothed and then chilled to 40° F. and packaged.

*Example II*

The collagen dispersion of Example I was prepared by trimming beef tendons of foreign matter, lean meat and excessive fatty tissue. The tendons were hard frozen in block form and were sliced lengthwise parallel to the fiber bundles thereof to form a plurality of slices approximately 1/32 of an inch thick. The tendon slices were placed in a sodium hydroxide solution having a pH of 12.5. A 1% collagen solution based on solids concentration by weight was formed. The solution was maintained at approximately 20° C. for a period of 2 hours at which time maximum swelling of the tendon slices had occurred. The mixture was completely homogenized by passing the same through a colloid mill four times.

*Example III*

Pork sausage link-type products were formed, shaped and hard frozen in the same manner as set forth in Example I. A 0.9% basic collagen dispersion and a 1.1% acidic collagen dispersion were prepared in accordance with the procedures set forth in Example II with the pH of the acidic dispersion being 2. The basic collagen dispersion was sprayed onto the hard frozen links to completely coat the same followed by immediate freezing of the basic coating on the surfaces of the links. The links were then further coated with the acidic collagen dispersion accompanied by immediate freezing of this second coating on each of the links. The coated links were placed in a stream of 20% relative humidity air maintained at a temperature of approximately 70° F. for 60 minutes during which time the collagen coatings were dried. The pH of the dried coatings was found to be approximately the same as that of the meat.

Obviously, certain modifications and variations of the invention as hereinbefore set forth may be made without departing from the spirit and scope thereof, and there-

We claim:

1. The method of preparing a collagen encased comminuted sausage-type product comprising shaping the product, while maintaining the shape of the product, applying to the surface thereof a continuous coating of a dilute homogenized collagen dispersion wherein the collagen is present in the form of swollen fibers of substantial length, the length of said fibers being sufficient to form a mat-like matrix, and then drying the coating on the product.

2. The method of claim 1 wherein said product is at least surface frozen prior to the coating application, said coating being dried at a temperature below the melting point of the fat in the product and above the freezing point of water.

3. The method of claim 1 wherein the collagen in said dispersion is present at a concentration of at least about ½% solids.

4. The method of preparing a collagen encased comminuted sausage-type product comprising shaping the product, and while maintaining the shape of the product, applying to the surface thereof a first continuous coating of a dilute homogenized basic collagen dispersion and a further coating of a dilute homogenized acidic collagen dispersion wherein each coating the collagen is present in the form of swollen fibers of substantial length, the length of said fibers being sufficient to form a mat-like matrix, and then drying the coatings on the product.

5. The product prepared by the method of claim 1.

References Cited in the file of this patent

UNITED STATES PATENTS

| | | |
|---|---|---|
| 2,337,645 | Cadwell | Dec. 28, 1943 |
| 2,352,611 | Bowers | July 4, 1944 |
| 2,477,742 | Hall | Aug. 2, 1949 |
| 2,517,595 | Owens et al. | Aug. 8, 1950 |
| 2,557,871 | Harnack et al. | June 19, 1951 |
| 2,558,042 | Cornwell | June 26, 1951 |